United States Patent [19]
Fleischer

[11] 3,972,568
[45] Aug. 3, 1976

[54] VEHICLE BRAKE ANTI-BLOCK SYSTEM WITH SELECTIVE STEERING, OR BRAKING PRIORITY

[75] Inventor: Helmut Fleischer, Schwieberdingen, Germany

[73] Assignee: Robert bosch G.m.b.H., Stuttgart, Germany

[22] Filed: May 30, 1975

[21] Appl. No.: 582,184

[30] Foreign Application Priority Data
June 20, 1974  Germany.............................. 2429555

[52] U.S. Cl................................. 303/21 A; 303/20; 303/21 BE
[51] Int. Cl.²............................................ B60T 8/02
[58] Field of Search ............... 188/181; 303/20, 21; 307/235 R; 317/5; 324/161–162; 328/115, 137, 152, 154; 340/53, 62

[56] References Cited
UNITED STATES PATENTS

| | | |
|---|---|---|
| 3,535,004 | 10/1970 | Howard et al................. 303/21 EB |
| 3,790,227 | 2/1974 | Dozier.......................... 303/21 P X |
| 3,794,389 | 2/1974 | Davis et al..................... 303/21 P |
| 3,866,979 | 2/1975 | Rabus et al.................. 303/21 P X |

*Primary Examiner*—Stephen G. Kunin
*Attorney, Agent, or Firm*—Flynn and Frishauf

[57]  ABSTRACT

A wheel brake anti-lock system comprises a circuit which senses which one of the front wheels turns faster than the other and, in dependence on sensed applied braking fluid pressure, as controlled by the operator, the anti-lock system bases its control characteristics on either the faster, or the slower one of the wheels, thereby favoring either braking effort, or steering and attitude control; when the braking pressure is high, commanding fast stops, braking effort is favored; when the braking pressure is low, attitude control is favored, thus preventing skids on differentially slippery surfaces with respect to the right and left wheels of the vehicle.

8 Claims, 12 Drawing Figures

REAR WHEEL SYSTEM

FRONT WHEEL SYSTEM

SHOWN IN "SELECT LOW" MODE

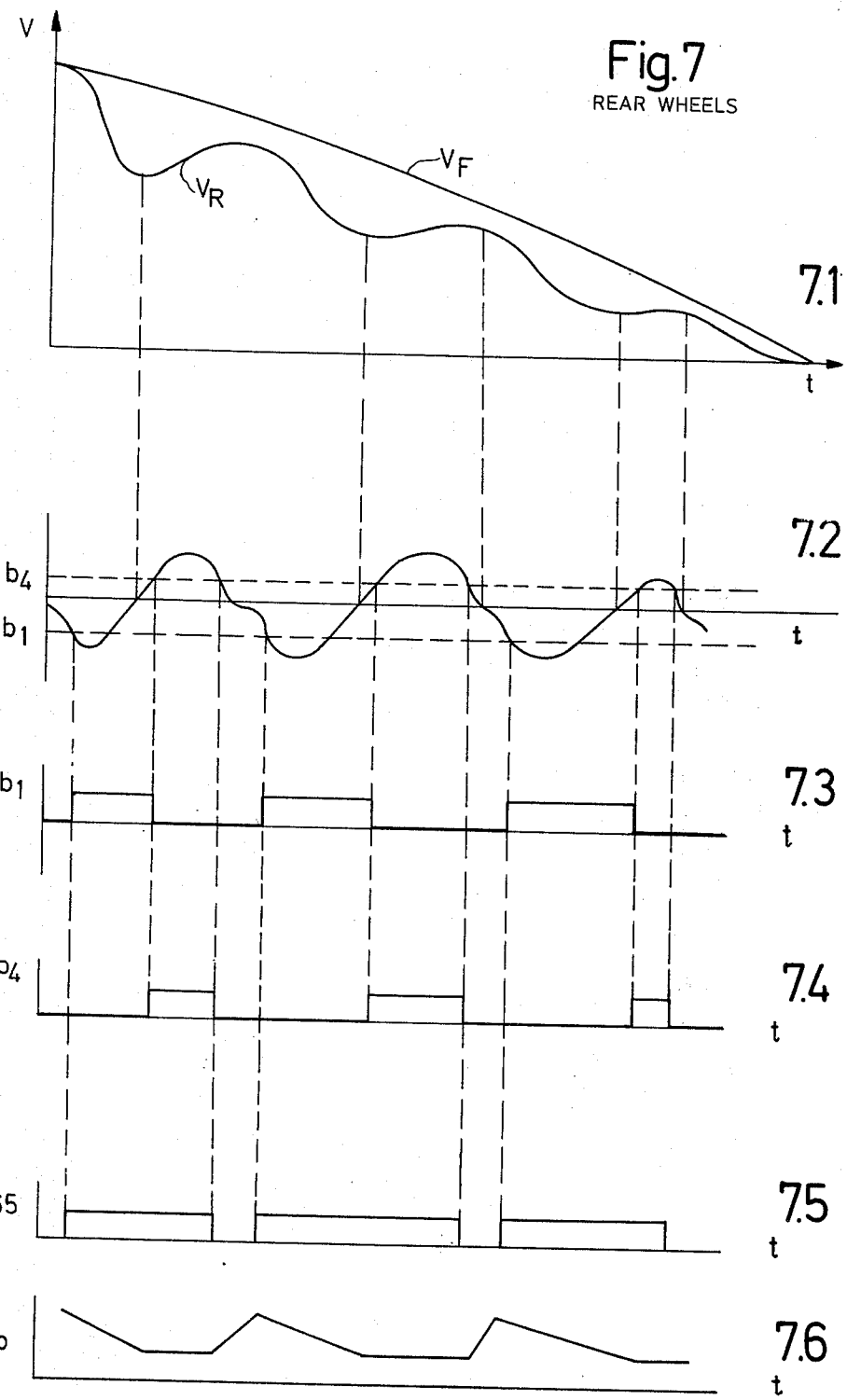

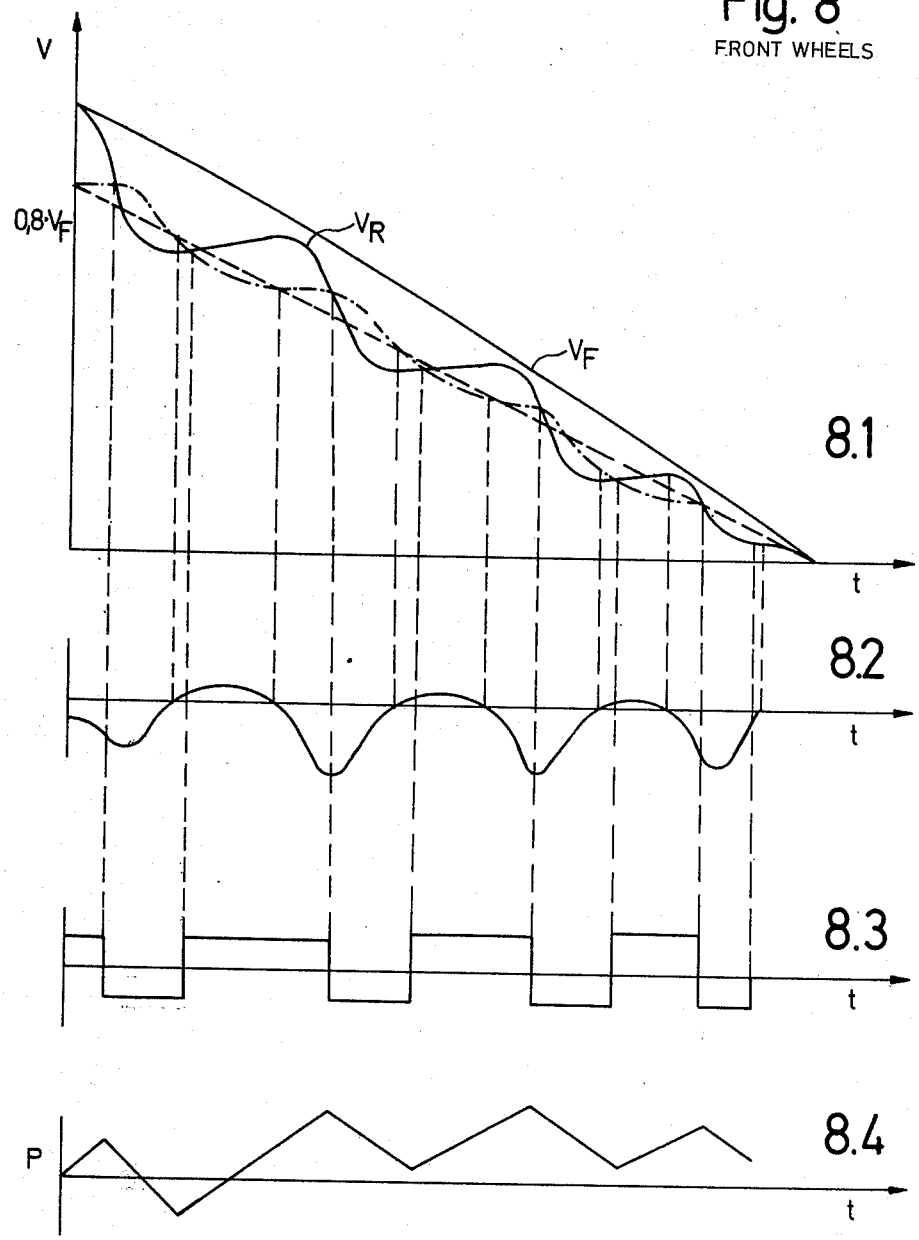

SHOWN IN "SELECT HIGH" MODE

VEHICLE BRAKE ANTI-BLOCK SYSTEM WITH SELECTIVE STEERING, OR BRAKING PRIORITY

CROSS REFERENCE TO RELATED PATENTS:

U.S. Pat. Nos. 3,874,743; 3,820,857; 3,833,270; 3,829,168, and 3,874,741 all assigned to the assignee of the present application.

The present invention relates to a vehicle brake anti-locking system and more particularly to an anti-locking system in which pressurized fluid brakes are used, the system becoming effective upon measured acceleration (or, its algebraic negative, deceleration) of vehicle wheels, and comparative circumferential speed of the wheel with respect to linear speed of the vehicle.

Vehicle wheel brake anit-lock systems can be controlled by basically two different parameters. In accordance with one such system, the rate of change of wheel speed-acceleration or deceleration, respectively, with respect to time is being sensed and a signal derived which is used as the control parameter. Each one of the wheels is provided with sensing elements so that separate wheel rate-of-speed change signals are obtained. If the road surface is very slippery, for example covered with snow or ice, locking of a respective wheel cannot necessarily be readily detected, since deceleration of the wheel to blocked condition may occur very slowly.

The second type of control for vehicle wheel anti-locking systems utilizes a slip signal as the control parameter, which is a signal derived by comparing the difference between linear circumferential speed of a wheel and vehicle speed. This wheel slip, as referred to in this specification, is a slip quantity or parameter which is representative of the difference between circumferential wheel speed and absolute vehicle speed with respect to the surface over which the vehicle operates.

Obtaining a vehicle speed signal as a reference signal causes problems. Two-axle, automotive vehicles, when braked, exert about 70 percent of the braking effort on the front wheels due to the dynamic shift in weight when braking the vehicle. Thus, and assuming equal braking pressure differential in a fluid braking system, the rear wheels will lock first. This must be avoided, however, in order to retain stability of attitude of the vehicle. Due to the lesser braking effort applied by the rear wheels, it is, therefore, possible to sacrifice some braking effort from the rear wheels in order to obtain a lesser slip. A lesser slip, however, means that the difference between circumferential wheel speed and vehicle speed should be smaller. The reference signal to be obtained for vehicle speed is, therefore, best obtained from a revolution or rotation signal derived from the rear wheels.

Vehicle wheel anti-lock systems can also be classified in relation to the dependence of the wheels with respect to the control signals. Dependent and autonomous control can be distinguished. In autonomous control for a specific wheel, the particular braking control for a wheel requires a speed signal of an acceleration-deceleration signal and the particular braking control exerted on the wheel is dependent only on the signal derived from that wheel, and independent of signals from any other wheels. This system of braking control, in usual customary arrangements, is usually applied to those wheels which are not driven. The driven wheels are usually controlled by signals which are a combination or a composite of acceleration-deceleration signals as well as slip signals.

Vehicle wheel anti-lock control systems are particularly necessary when operating in wintertime, that is, on roads which are covered by snow or ice. It frequently occurs that the grip exerted by the wheels on the road surface is not uniform across the width of the vehicle; for example, the edge of a road may be iced, but the center of the road may be free of snow and ice. This is the reason why, customarily, each wheel is separately controlled in order to obtain optimum braking effort at each wheel. Under conditions in which the grip by the wheels on the road is non-uniform with respect to left and right wheels, the vehicle may tend to yaw, and some decrease in steering precision and stability results. Yaw about the vertical axis of the vehicle can tend to cause the vehicle to skid laterally. Stability and compensation for yaw can be obtained by selecting a common control for the rear axle of the wheel, and selecting the poorest gripping wheel as the one which effects this common control. This is particularly effective if the degree of grip by the rear wheels on the road surface is highly unsymmetrical. This system has the advantage that only small yaw torques will result even though the road surface is highly unsymmetrical, while requiring only comparatively low expense in structure and equipment. The braking path may increase by about 20 percent, however, with respect to separate control of all wheels, due to the lower braking effort exerted by the rear wheels. This is a disadvantage with respect to separate control of all wheels. The wheels of the rear axle must be controlled in accordance with the wheel having the lowest speed.

Common control of the front wheels results in further decrease of yaw torques when the road surface is non-symmetrical. Due to dynamic shift in the weight distribution of the vehicle, as well as due to the greater proportion of braking effort exerted by the front wheels upon braking, an unduly long brake track would be obtained, however, if a common control were resorted to.

It is an object of the present invention to provide a vehicle wheel anti-lock system which is simple in construction and which provides optimum relationship between tracking, that is freedom from skidding, and maintenance of attitude, while being simple and providing for effective braking effort.

SUBJECT MATTER OF THE PRESENT INVENTION

Briefly, a pressure differential fluid controlled system is provided in which a valve is located so that the brakes of both wheels of one axle are equally affected thereby. The pressure differential control system is so selected that the wheels which are not autonomously or separately controlled have their braking pressure regulated as selected by a selection circuit, which selection circuit is set to evaluate only the higher one, or the lower one of the circumferential wheel speed as a control parameter.

The setting of the selection circuit, in accordance with a feature of the invention, can be determined by the pressure of the unregulated differential braking pressure; at lower braking pressures, the selector senses, and determines the control in accordance with the wheel with the lowest speed; at high pressure, the selector is sensitive to the wheel having the highest speed.

The invention will be described by way of example with reference to the accompanying drawings, wherein.

Figure 5:
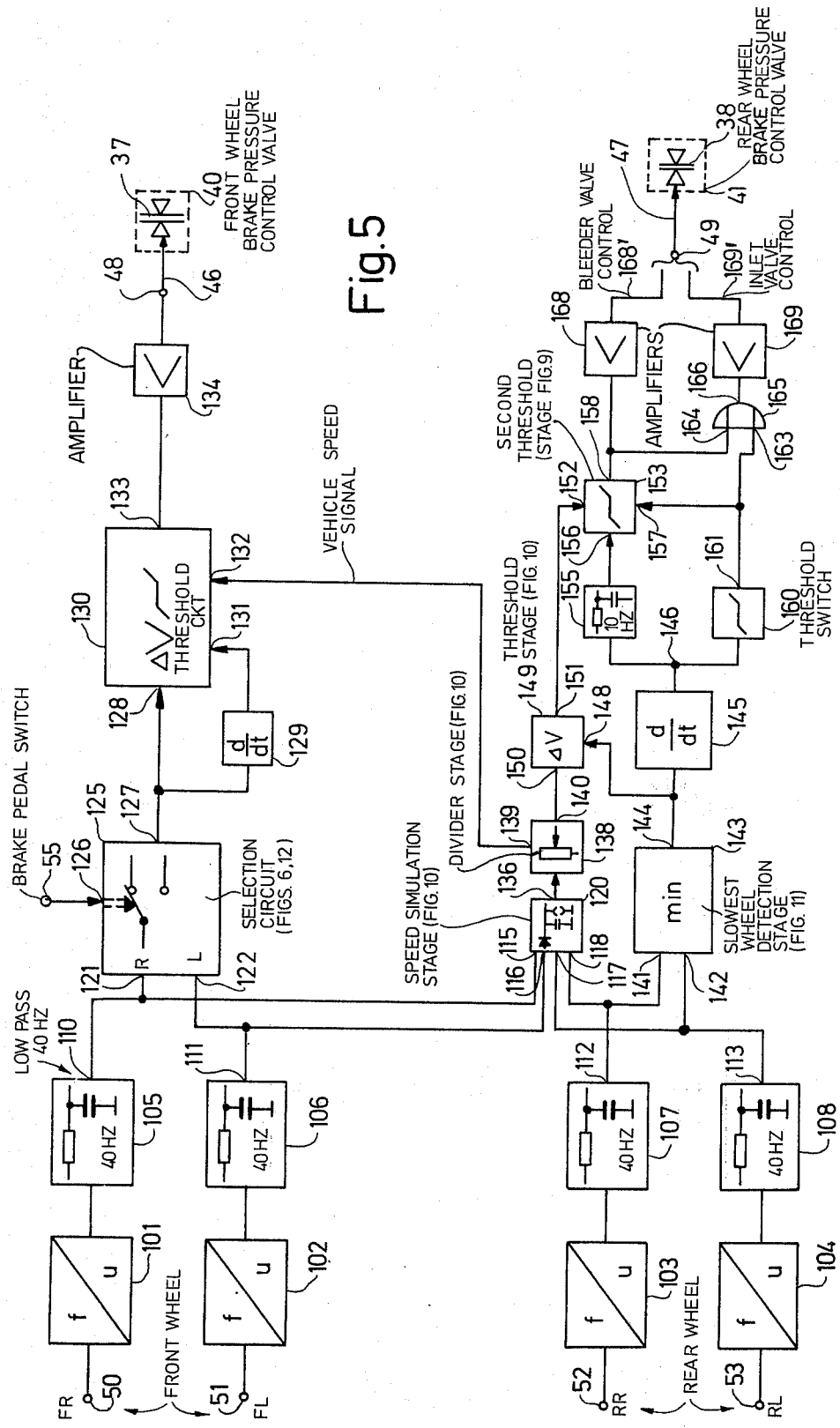
FIG. 5 is a block circuit diagram of an anti-lock system having a selection circuit.
Figure 9:
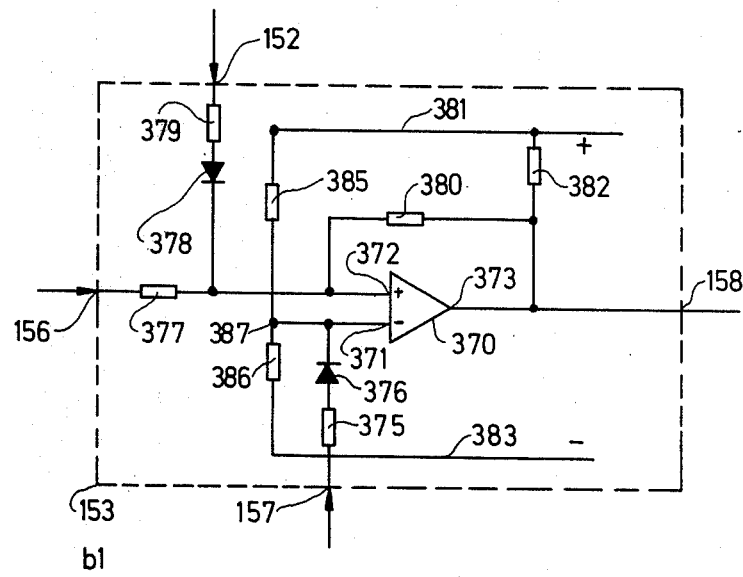
Figure 10:
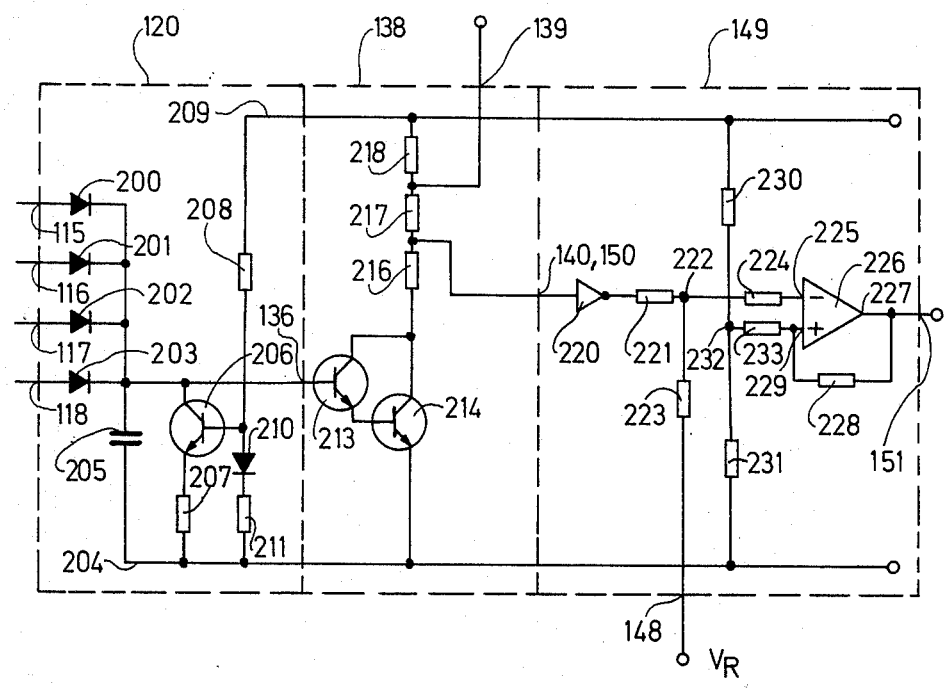
Figure 11:
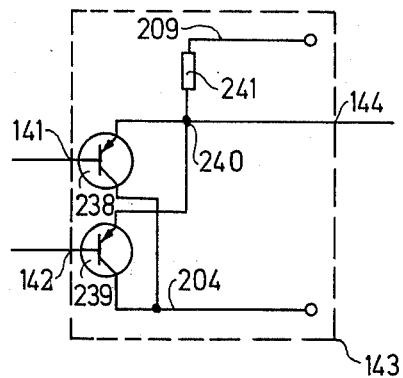
Figure 12:
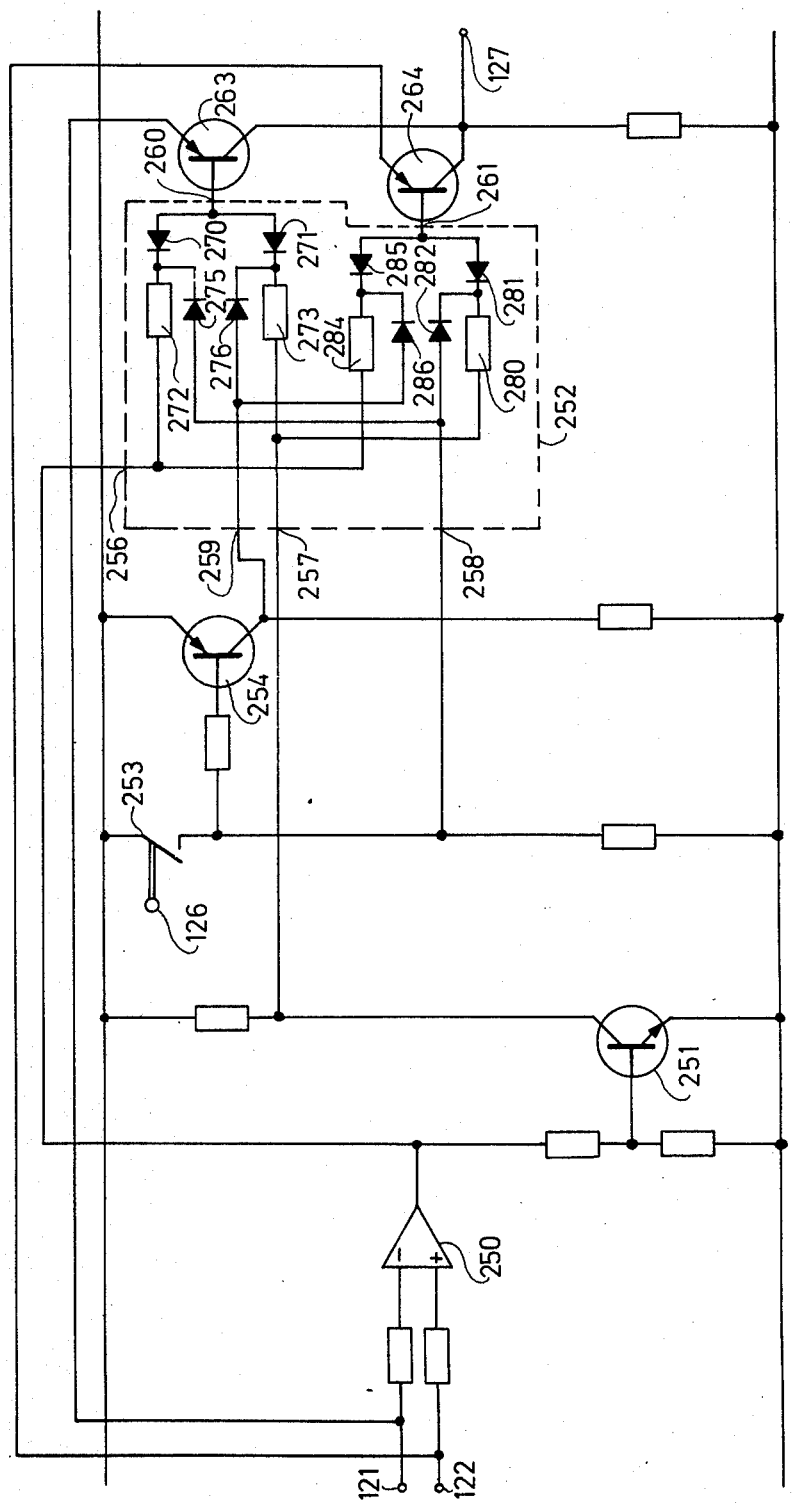

FIG. 7, consisting of lines 7.1 to 7.6, is a pulse and timing diagram when using acceleration as the sensing parameter;

FIG. 8, consisting of lines 8.1 to 8.4, is a diagram similar to FIG. 7 but illustrating control by slip;

FIG. 9 is a circuit diagram of a threshold switch or threaded circuit;

FIG. 10 is a schematic circuit diagram of a vehicle speed simulation circuit and a slip threshold switch;

FIG. 11 is a schematic circuit diagram of a selection circuit to select the lower one of a speed signal from two wheel speeds;

FIG. 12 is a schematic circuit diagram of another embodiment of the selection circuit of FIG. 5.

Figure 1:
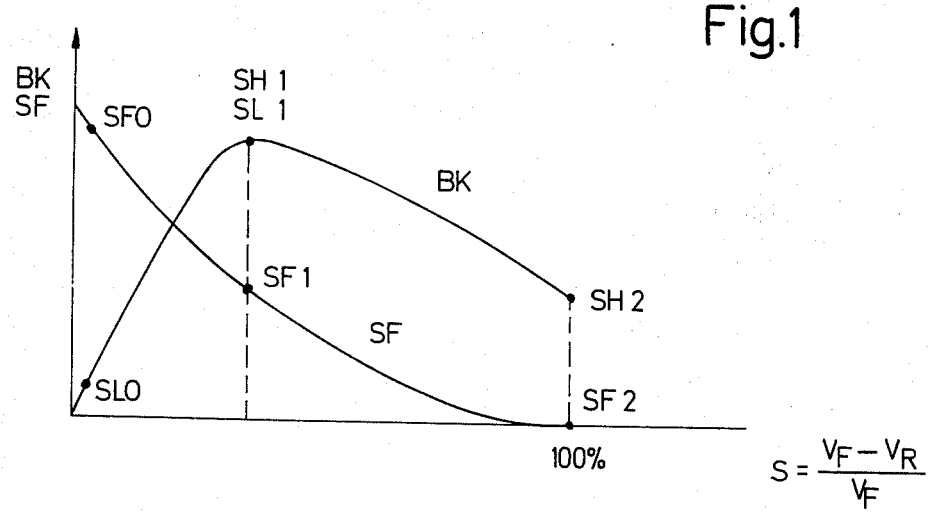
FIG. 1 illustrates the relationship of braking effort and lateral, or yaw, or attitude maintenance capability (at the ordinate) with respect to slip (abscissa)

The operation and basic considerations relating to the concept of the invention are best explained in connection with FIG. 1. Considering first the braking effort curve labelled BK, with respect to slip (abscissa), in which slip is indicated in percent. As illustrated, braking effort will have a maximum as known from ordinary braking-vs.-slip relationships; if the road surface is covered with snow or ice, however, the braking effort will increase in gradually rising effect up to a maximum at maximum slip, that is, blocking of the wheel. FIG. 1 further illustrates the lateral guide forces with respect to slip — that is, the reciprocal of the tendency to yaw with respect to slip. The lateral or side force curve decreases over the entire region or range of the slip. Considering both curves at any one braking event, it can be seen that a compromise between maximum braking effort and lateral guide force (or resistance to yaw) must be made. The yaw resistance forces, or counter torque, are high before the braking effort has reached its maximum. In the illustrated example, maximum braking effort is obtained at a time when the lateral guide forces have only half their maximum value. As the braking effort decreases downwardly from optimum slip to locking, the lateral guide forces eventually reach zero.

In accordance with an important feature of the invention, one wheel of the wheels of an axle which are not individually or autonomously controlled is maintained at optimum slip; the wheels of another axle are operated in accordance with the then desired operating mode, either to maintain good lateral attitude stability, or to provide maximum braking effort.

The selection circuit selects and changes over between the two operating modes. It selects between "select low" or low value setting, in which the wheel having the lowest circumferential speed provides the control signal or parameter; if the selection circuit is in the "select high" range or mode, selection is effected in accordance with the wheel with the highest speed. Thus, the wheel with the highest speed can just idle along or roll along if the selection circuit is set for the "select-low" mode without exerting any braking effort at all, thus preventing yaw; if the selection circuit, however, is in the select high range, the wheel which is not controlled with the locked. FIG. 1 illustrates that, upon operating in the select low mode, lateral or attitude guidance is selected at the primary selection or control parameter for the wheel braking control system; braking effort, however, is the primary selection parameter when the selection circuit is in the select high range or mode, and provides priority with respect to the lateral or attitude guiding effort.

The point SF 0 is in the range of maximum attitude or guiding force; point SF 1 shows the point on the SF attitude force curve which corresponds to maximum braking effort, or optimum slip; point SF 2 corresponds to mimimum lateral or attitude guiding force. In the brake force curve BK, optimum slip is indicated by point SH 1, and SL 1, corresponding to both the range or mode settings, select high (SH) and select low (SL) at very low slip, a value of SL 0 corresponding to low range or low mode selection is indicated; the maximum slip, and corresponding to a point to a point SH 2, upon the select high range or mode setting is also shown. The slip S is defined on FIG. 1, where $V_F$ is the speed of the vehicle and $V_R$ is the linear circumferential wheel speed.

Figure 2:
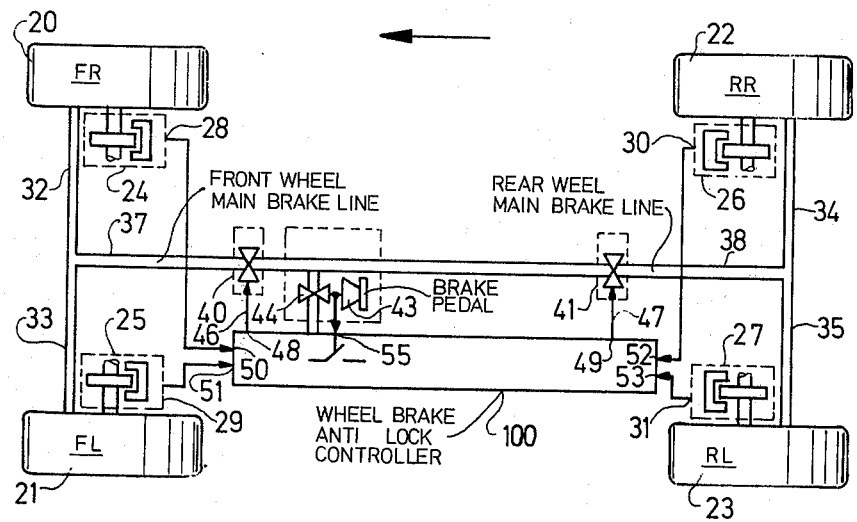
FIG. 2 is a schematic illustration of a four-wheel, two-axle vehicle and its braking system.

FIG. 2 illustrates, in highly schematic form, a two-axle vehicle, such as an automobile, and so much of the equipment which is necessary for an understanding of the wheel anti-lock control system with which the present invention is concerned. The two front wheels 20, 21 have a common axle, but are independently rotatable. The rear wheels 22, 23 are on a common axle and independently rotatable. All four wheels 20, 21, 22, 23, each, have an independent speed signal generator 24-27, respectively, associated therewith. The outputs 28-31 of the respective speed signal generators provide output signals having a frequency which is proportional to the wheel speed, which frequency can be converted to a representative analog voltage.

A separate brake line 32-35 leads to the respective wheels 20-23. The brake lines 32, 33 are connected to a common or joint front wheel main brake line 37. The two rear wheels 22, 23 each have branch brake lines 34, 35 which are connected to a common rear wheel main brake line 38. A brake pressure supply controller is connected to a brake pedal 43 and, in dependence on the position of the brake pedal, supplies pressurized brake fluid through a valve 44 to the main brake lines 37, 38 which, each, have valves 40, 41 included therein.

The electronic anti-wheel lock controller 100 — the contents and operation of which will be described in detail below — has output lines 46, 47 connected to output terminals 48, 49, respectively. Inputs 50–53 connect the outputs from the wheel speed sensing systems 24–27 to controller 100. A further input 55 is provided which controls the switch-over of the system, switching in dependence of brake pressure before control or regulation thereof by controller 100 as applied to the wheel brakes themselves, that is, operated in dependence on the selection or choice of brake pressure by the vehicle operator. The unregulated pressure can be considered at that braking fluid pressure which occurs in advance of the control valves 40, 41, that is, in advance of the control valves and upstream with respect to the wheels — of the valves.

Figure 3:
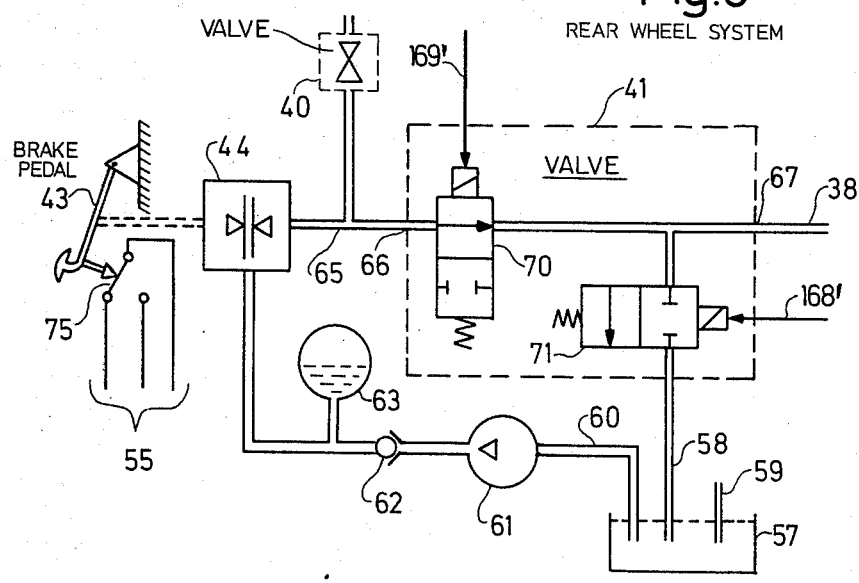
FIG. 3 is a schematic illustration of the braking system for the rear wheels of the vehicle of FIG. 2.

The rear wheel braking system is explained in detail in connection with FIG. 3, in which the details of valve 41 are also shown. The brake pedal 43 controls the relative opening of a brake valve 44 which admits pressurized brake fluid supplied by a pump 61 from a sump 57 through an inlet or suction pipe 60 and over a check valve 62. A pressure vessel 63 is provided, used as a pressurized fluid reserve and providing brake fluid under constant pressure to valve 44, so that the pressure of fluid at the input to valve 44 will always have the same value. Pressure fluid return lines 58, 59 terminate in sump 57. The output from valve 44 is a main line 65. Line 65 supplies uncontrolled pressurized brake fluid when so commanded by operation of brake pedal 43 to an input 66 of valve 41, as well as to valve 40. Valve 41 actually is a valving arrangement. This valving arrangement for the rear wheels includes an electrically operated inlet valve connected between the input 66 to valve arrangement 41 and the output 67 thereof. When the electromagnet of valve 70 is de-energized, that is, in the quiescent position of the valve, pressurized brake fluid will flow from input 66 to output 67 and thus provide pressurized brake fluid to the main rear brake line 38. It is here assumed that a drain valve 71 which connects to a bleeder or branch line between input 66 and output 67 is likewise de-energized and in quiescent condition. The valves are schematically shown in quiescent condition. Thus, when valve unit 71 is de-energized, flow therethrough is inhibited. The inlet valve 70 as well as the bleeder or drain valve 71 are electromagnetically operated, and reset under spring force. If inlet valve 70 is open and drain valve 71 is closed, pressure in the rear wheel main brake line 38 will rise. When the inlet valve 70 is energized, so that the valve will close, pressure in line 38 will remain constant. The pressure will drop when the bleeder valve 71 is opened while the inlet valve 70 is closed.

An electric change-over switch 75 is connected to the brake pedal 43, electrically connected to the input 55 of the controller 100 of the vehicle wheel anti-lock controller 100.

Figure 4:
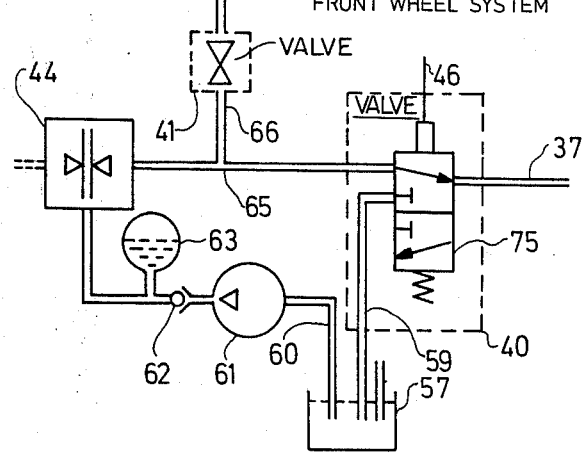
FIG. 4 is a schematic illustration of the braking system for the front wheels of the vehicle of FIG. 2.

FIG. 4 shows the corresponding brake system for the front wheels. The unregulated pressure supply of brake fluid is identical to that of FIG. 3, and indicated merely schematically by line 65. The brake valve arrangement 41 and the input 66 thereto are also schematically indicated. Pump, check valve and reservoir are shown schematically, and, since the parts are similar, they have been given the same reference numerals and need not be explained again. They may be duplicated, or the same system as that used for the rear wheels may be used. The difference between the rear wheel system (FIG. 3) and the front wheel system of FIG. 4 essentially is the particular valve arrangement. Valve 40 differs from the two valves 70, 71 of the rear wheel system of FIG. 3 in that a 3/2-way valve is used as the control element for the controlled brake pressure. This valve, when in quiescent condition, permits an increase in brake pressure when not energized, that is, it directly connects the inlet of the unregulated pressure, that is, line 65 to the main front wheel brake line 37. When energized, the line 37 is connected to drain line 59 by valve 75. The intermediate position of maintenance of a certain pressure thus is not possible. The brake pressure, rather, increases or decreases, resulting in a sawtooth wave form pressure, when diagrammatically illustrated with respect to time. This valve, also, is electromagnetically operated and is held in quiescent position, as shown in FIG. 4, by a spring.

The controller 100 is generally shown in FIG. 5. For ease of illustration, the front wheels have been additionally denoted FR and FL (for the right and left side, respectively) and the rear wheels RR and RL, for the right and left side, respectively, from which signals 50-53 are derived, representative of the rotational speed of the respective wheel. The output terminals 48, 49 are, respectively, connected to valves 40, 41 as also shown in FIG. 2.

The inputs 50-53 are connected to a series circuit which includes a digital-analog converter, each, 101-104, and a low-pass filter 105-108, having an approximate upper cut-off frequency at about 40 Hz. Preferably, these filters are constructed as third degree, or approximation filters and are used in order to filter short-time changes in the wheel speed signals. Such changes may arise due to oscillation of the wheel suspension or if the respective wheel should pass through pot holes, ruts, or the like.

The outputs 110-113 of the low-pass filters 105-108 are connected to respective inputs 115-118 of a speed simulation stage 120. The outputs 110, 111 of the low-pass filter 105, 106 are additionally coupled with inputs 121, 122 of a selection circuit 125. The selection circuit 125 is controlled over input 126, connected to terminal 55, receiving from input 126 a signal depending on the pressure commanded by the brake pedal 43. The selector circuit 125 has an output 127 which is connected directly to an input 128 of a threshold switch or threshold circuit 130; the threshold switch or threshold circuit is additionally connected to the output 127 of the selection circuit 125 over a differentiator 129, which connects to an input 131 of the threshold circuit 130. The threshold circuit 130 has an additional input 132. Its output 133 is connected to an amplifier 134, the output of which is connected to terminal 48 which, over connecting line 46, controls valve 40 which controls the brake pressure in the front wheel main brake line 37 leading to the front wheels 20, 21.

Front wheel control is based on measuring slip. Input 132 of the threshold switch 30 has a signal applied thereto representative of vehicle speed. This vehicle speed signal is derived from a speed simulation stage 120 at an output 136 thereof, which output is connected to a signal divider 138, preferably constructed as a potentiometer, having two outputs 139, 140. The output 139 of the divider 138 provides the vehicle speed signal to terminal 132 of the threshold switch 130. This signal forms a vehicle speed reference signal, and will usually be somewhat less than the signal representative of actual vehicle speed, that is, the signal derived from the speed simulation stage 120, in order to permit some leeway with respect to noise level. The attenuation, or division of the output value from divider stage 138 is usually set so that the signal at terminal 139 will be about 85 percent of the signal derived from terminal 136.

The outputs of low-pass filters 107, 108 which provide signals representative of rear wheel speed are connected not only to the speed simulation stage 120 but additionally to a slowest wheel detection stage 143, by being connected to inputs 141, 142 thereof. The output from stage 143 — in which the speed of the slowest turning rear wheel is determined — is available at terminal 144 which is connected on the one hand over a differentiator 145 with a junction 146 and, on the other, to an input 148 of a threshold stage 149. The threshold stage 149 has a further input 150 coupled to the output 140 of the speed simulation signal divider 138. The output from threshold stage 140 is available at a terminal 151 and coupled to an input 152 of a further threshold stage 153. Junction 146 is connected over a low-pass filter 155 with a second input 156 of the second threshold stage 153.

A threshold switch 160 is further connected to junction 146. Output 161 of threshold switch 160 is connected to a third input 157 of the second threshold stage 153 and, additionally, to one of two inputs 163, 164 of and OR-gate 165, the other input of which is connected to output 158 of the second threshold stage 153. Output 158 of threshold stage 153 is further connected to an amplifier 168; output 166 of OR-gate 165 is connected to an amplifier 169. The outputs from the amplifiers 168, 169 are connected at terminal block 49 to table 47 which controls the valve unit 41. Specifically, the output from amplifier 169 is connected to line 169' which is connected to the inlet valve 70 (FIG. 3), whereas the output from amplifier 168 is connected over line 168' to the bleeder valve 71. When the respective lines 168', 169' are energized, then the valves are changed from the position shown in FIG. 3 to the respective operated position. When the output signal from second threshold stage 153 is positive, the inlet valve 70 as well as the outlet valve 71 are energized, causing a drop in brake pressure in the rear brake line 38. If the output signal of the threshold switch 160 is positive, then only the inlet valve 70 is operated and thus the pressure in the main rear brake line 38 will remain constant. Pressure in the rear main brake line 38 may rise when both valves 70, 71 are not operated, that is, in the quiescent condition shown in FIG. 3.

Operation, with reference to FIGS. 5, 7 and 8: The speed transducers 24–27 (FIG. 2) provide a signal having a frequency proportional to wheel rotation. This signal is applied at terminals 50–53 to D/A converters 101–104, which provide signals having an analog value representative of frequency. These signals are filtered in the low-pass filters 105–108 which have a damping value of about 18 dB per octave, and an upper limit frequency of about 40 Hz. These filters remove stray variations due to torsion oscillations of the wheel, for example when the wheels are subject to sudden changes in level, occasioned, for example, by going through a rut or pot hole.

Stage 143 determines the speed of that rear wheel which turns slowest, due to its connection with the outputs of low-pass filters 107, 108 deriving wheel speed signals from the rear wheels. This selection, automatically, provides a signal which automatically leads to that wheel which will block soonest. The deceleration, or negative rate-of-change of the slowest turning wheel is obtained by differentiating the signal from stage 143, that is, the speed proportional signal of that wheel which turns slowest. FIG. 7 graphically illustrates a braking cycle. Line 7.1 shows the vehicle speed $V_F$; the circumferential wheel speed of a controlled wheel is shown by curve $V_R$. Line 7.2 illustrates the derivative of the wheel speed $V_R$, with respect to time. Thus, the wheel, initially, is decelerated only to a minor extent but then decelerates rapidly. The control terminates this deceleration by lowering braking fluid pressure, thus initially decreasing deceleration, and then permitting the wheel to reach an acceleration phase. When the wheel circumferential speed approaches vehicle speed, braking pressure can be increased again. This increase is not immediately effective, however, and the wheel will continue to accelerate. Acceleration will pass through a maximum value and then the wheel will again decelerate. The cycle will repeat. This is obtained in the system in the stages subsequent to the differentiator 145 (FIG. 5). The branch which controls pressure drops includes the low-pass filter 155 and the second threshold stage 153. Since a drop in pressure means that the braking effort is decreased, low-pass filter 155 is provided in order to filter out short-time noise signals. It has a limit frequency of about 10 Hz and a damping of about 12 dB per octave.

Second threshold stage 153 responds when the value of the derivative of speed, as indicated in line 7.2 on FIG. 7, drops below threshold level $b_1$, as indicated by dashed lines in line 7.2. The threshold stage 153 will then provide a positive signal at its output 158, and this signal is indicated in line 7.3. Brake pressure will drop when this signal persists, thus causing a rise in wheel circumferential speed, as seen in line 7.1 of FIG. 7, and also in line 7.2, indicating that the derivative will have a positive slope. Drop in brake pressure must be terminated, however, when a certain threshold level of positive acceleration of the wheel is exceeded. Constant pressure will be commanded at this point of the cycle, corresponding to energized input valve 70 and de-energized bleeder valve 71 (FIG. 3). This is obtained in the circuit of FIG. 5 by an output signal from the threshold switch 160 — indicated in line 7.4 — which causes a signal from amplifier 169 to appear on line 169'. The pulse diagram corresponding to this cycle is shown in line 7.5, which illustrates the output from OR-gate 165. Line 7.6 illustrates the brake pressure in the rear brake line 38 with respect to time.

Acceleration of the controlled wheel will reach a maximum during the phase of constant brake pressure, and will then again decrease. The bleeder valve 71 must again be returned to quiescent condition in order to retain the braking pressure at a constant level, that is, the output signal at the output 168' from amplifier 168 must be inhibited. This is obtained by resetting the second threshold stage 153 with the positive flank of the output signal from the threshold switch 160, applied at terminal 157.

When the threshold determined by the threshold switch 160 is again passed in a negative direction, see line $b_4$ in line 7.2 of FIG. 7, the signal at output 161 of threshold switch 160 will fail. Thus, no signal will be applied to the terminal block 49 and brake pressure can rise again since both valves 70, 71 controlling drop or constant brake pressure are de-energized. As the brake pressure rises, at least one of the rear wheels will again decelerate and pass below the deceleration level controlled by the second threshold stage 153, that is, level $b_1$. The cycle can again repeat.

When driving in snow, the situation can occur that a braked wheel pushes snow in front of it and eventually reaches locking stage without having been highly decelerated. Response of threshold stage 153 cannot be ensured in such a case, since it is possible that the deceleration of the wheel does not fall below the level indicated by $b_1$ in line 7.2 of FIG. 7. The slip control is provided to sense wheel locking under these conditions. The slip control is connected in parallel to the wheel speed rate-of-change control. The slip control becomes effective when the difference in speed between vehicle speed and that wheel which turns slowest exceeds a predetermined value. Slip control is independent of acceleration and provides additional reliability and operating safety. Vehicle speed is determined by sensing the highest circumferential wheel speed of any one of the wheels and applying it to the input 150 of the threshold switch 149 over the slip divider stage 138. The second input 148 has the speed signal of the slowest rear wheel applied thereto, derived from the slowest wheel detection stage 143.

The front wheels are controlled by a pure slip control. The threshold stage 130 compares circumferential wheel speed and vehicle speed. A signal representative of vehicle speed is derived from the speed simulation divider 138. If the above referred-to difference between vehicle speed — as simulated — and circumferential wheel speeds exceeds a certain threshold value, threshold stage 130 will provide at its output 133 a signal which will cause lowering of brake fluid pressure by energizing the front wheel brake pressure control valve 40. If the output signal at terminal 133 is a O-signal, then the 3/2 valve 75 (FIG. 4) and forming the valve element of unit of front wheel valve 40 is closed, thus opening the brake pressure supply connection to lines 37 and causing a rise in braking pressure. The threshold level, that is, the difference between circumferential wheel speed and vehicle speed can be controlled; this difference value can be varied in dependence on acceleration or deceleration of the front wheels. Differentiator 129 (FIG. 5) provides a signal which is representative of rate of change of speed of the front wheels, thus is a signal corresponding to acceleration or deceleration, respectively, of these wheels. This acceleration or deceleration value is applied to input 131 of the threshold stage 130, in order to change the threshold level thereof.

The operation of the control with respect to the front wheels is graphically illustrated in FIG. 8. Line 8.1 illustrates at curve $V_F$ the speed of the vehicle which decreases approximately uniformly; curve $V_R$ illustrates, again, a circumferential vehicle speed. Due to the control effected by the system, this curve is wavy. The difference between vehicle speed and wheel speed is indicated by the chain-dotted line and a value of approximately 0.8 of vehicle speed is indicated by the broken line. An independent starting point of about 80 percent of vehicle speed has been found to be desirable. This starting point, or the initiation of control, is preferably shifted, as the wheel decelerates, in a direction of a lesser slip, that is, the starting point is preferably shifted to an earlier initiation of control. Conversely, the initial point of control effectiveness can be shifted towards a greater slip value, which causes a rise in brake pressure to occur somewhat earlier. The resulting curve is the chain-dotted curve of line 8.1 of FIG. 8. Line 8.2 in FIG. 8 illustrates the circumferential wheel speed with respect to time. This wave is derived by adding the dashed line of line 8.1 of FIG. 8 to the curve $V_R$, and the chain-dotted line of the graph 8.1 of FIG. 8 is then obtained. Line 8.3 of FIG. 8 illustrates the output signal of the threshold stage 130, and line 8.4 the pressure change in the front main brake line 37.

The system of FIG. 5 can be used for common control of both front wheels although the speed signal of only one wheel is utilized. If the road surface has non-symmetrical coefficients of friction, however, a question arises which wheel should control the system. Two possibilities arise. The wheel with the lower speed may be used, thus the wheel having the lower circumferential speed, and locking of the wheels can be prevented at the cost of decreased braking effort. This situation arises if a wheel is on a very slippery surface, such as on a sheet of ice (low $\mu$), whereas the other wheel is on a surface providing better traction, for example on road surface or gravel. The wheel which is on ice will lock at much lower pressure, that is, with a substantially lesser braking pressure then the wheel on the coarse, or rough surface. As a result, the braking effort of the wheel on the rough surface is not completely used. Good steering and attitude control is, however, ensured.

If the wheel with the highest speed is used to control the system, then the wheel on the slippery surface may lock. This causes a decrease in lateral steering accuracy, but much better braking is obtained. As discussed in connection with FIG. 1, two modes of operation are possible — select high or select low. The particular selection mode is controlled by sensing the uncontrolled braking pressure, for example sensing the position of the brake pedal. This position may also be sensed by sensing the uncontrolled pressure, for example by means of a pressure switch connected to the brake line which is controlled by the brake predal. Preferably, the select low mode is chosen when the brake pressure is low, since at smaller brake pressure good steering control is of primary importance. At higher brake pressure, however, higher braking effort is obtained and desired by the operator, so that then the select high mode is chosen. This particular division in operating modes is governed by the automatic reaction of automobile drivers; one will automatically press harder on a brake pedal when higher braking pressure is desired, that is, when it seems to be necessary to stop quickly.

Figure 6:
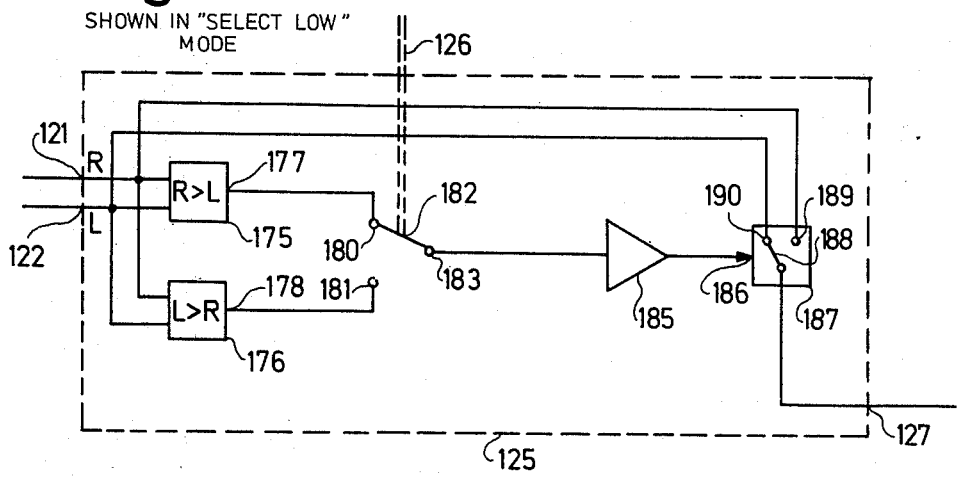
FIG. 6 is a block circuit diagram of the selection circuit.

A selector circuit suitable for the selector circuit 125 (FIG. 5) is shown in FIG. 6. It can be mechanically or electrically operated. Inputs 121, 122, 126 and output 127 correspond to the notation of FIG. 5. Line 121 and 122, respectively, are additionally labelled "R" and "L," respectively, to facilitate consideration of the operation of the circuit, these letters correspond, respectively, to the right and left signals derived from the respective front wheels. Two threshold switches 175, 176 are coupled to the inputs 121, 122. The outputs 177, 178 of the threshold switches are connected to respective transfer contacts 180, 181 of a transfer switch 182, the fixed contact 183 of which is connected to an amplifier 185. Amplifier 185 is connected to a second transfer switch 187. Transfer switch 187 has a transfer contact 188 which is connected to the output 127 of the selection circuit 125. The transfer contacts 189, 190 are, respectively, connected to the inputs 121, 122.

Operation: The threshold switch 175 provides a positive output signal when the signal at the input 121 has a higher value than that of the input 122. The relationship is reversed with respect to threshold switch 176, in which a higher signal at input 122 than at the input 121 provides for a positive output. In the position shown in FIG. 6, the transfer switch 182 operates in the selected low control mode. The select high control mode is provided when the transfer contact 182 transfers to the fixed terminal 181.

If the right front wheel FR has a higher speed than the left one, threshold switch 175 will provide a positive output signal to amplifier 185 and to the transfer switch 187. The positive signal here causes changeover, so that the input 122 will be connected to the output 127, and thus the wheel with the lower speed controls the operation. If the transfer switch 182 then changes, select high control is provided. At the same voltage relationships applied to inputs 121, 122, the output signal of threshold switch 176 will be zero and thus the transfer switch 187 will remain in quiescent condition. The output is connected, in that case, to the input 121 and thus the output has applied thereto that which corresponds to the higher speed. Detailed circuits for use with the present invention are illustrated in FIGS. 9 to 12. FIG. 9 is a detailed circuit diagram of the second threshold stage 153 (FIG. 5), which it has a positive output signal, causes a drop in braking effort. An operational amplifier 370 has an inverting input 371 and a direct input 372, and an output 373 which is directly connected to output 158 (FIG 5). The inverting input 371 of the operational amplifier 370 is connected over a series circuit formed of a resistor 375 and a diode 376 to the input 157 (FIG. 5). The direct input 372 is connected over resistor 377 with the input 156 and over a series circuit formed of a diode 378 and a resistor 379 to the input 152. The operational amplifier 370 has a feedback circuit which is resistive, formed by a resistor 380, connected between the output 373 and the direct input 372. The positive connection 381 is connected over a resistor 382 to the output 373. A voltage divider formed of resistors 385, 386 is connected between the positive bus 381 and the negative 383 of the system. The tap point 387 of the voltage divider is connected to the inverting input.

Operation: The output signal of the threshold stage 153 is positive and will occur when there is a voltage rise at input 156 — as a result of substantial deceleration of a rear wheel — or a voltage rise at the input 152 — as a result of excessive difference speed of a wheel with respect to vehicle speed.

The output signal of the threshold stage results in a drop in braking pressure, and thus leads to renewed acceleration of the wheels of the rear axle. If this acceleration exceeds a predetermined value, threshold switch 160 will respond and will reset the second threshold stage 153 over input 157, thus interrupting further drop in braking pressure at the rear wheels.

Speed simulation stage 120, divider stage 138 and first threshold stage 149 (FIG. 5): These stages are illustrated in detail in FIG. 10. The various connecting lines have been given the same reference numerals as those discussed in connection with FIG. 5.

Every one of the inputs 115–118 are connected over diodes 200–203, respectively, to a capacitor 205 connected to the negative or ground bus 204. Capacitor 205 is connected in parallel to a constant current source to discharge through the constant current source. The constant current source itself comprises a transistor 206, the emitter of which is connected over a resistor 207 with ground bus 204. The collector of transistor 206 is connected to the capacitor 205. The base of transistor 206 is connected, on the one hand, over a resistor 208 to positive bus 209 and, on the other, over a diode 210 and a resistor 211 with the negative bus 204. The collector connected terminal of the capacitor 205 forms the output 136 of the vehicle speed simulation stage 120, to which the divider stage 138 is connected. The divider stage itself includes a Darlington circuit formed of two transistors 213, 214, in which the emitter of transistor 214 is connected to negative bus 204. The series circuit formed of three resistors 216, 217, 218 is connected between the collector and the positive bus 209. The junction of the two resistors 216, 217 is connected to the output 140 of the divider 138; the junction of the resistors 217, 218 is connected to the output 139.

The output 140 of the divider stage is directly connected to, or forms the input 150 of the first threshold stage 149. Threshold stage 149 has a further input 148 and output 151. An inverter 220 and a resistor 221 are serially connected to the input 150 and, at the output, are connected to a junction 222 which is connected over resistor 223 to the input 148. Junction 222 is further connected over a resistor 224 to the inverting input 225 of an operational amplifier 226. The output 227 of operation amplifier 226 is connected to, or forms the output 151 of stage 149. A feedback resistor 228 is connected between the direct input 229 of the amplifier 226 and the output thereof. A voltage divider formed by resistors 230, 231 is connected between positive bus 209 and negative bus 204; the tap point 232 of the voltage divider is likewise connected to the direct input 229 of operational amplifier 226.

Operation: The constant voltage source formed of the transistor 206 and the circuit in connection therewith permits discharge of the capacitor 205 when the circumferential speed of the various wheels decreases. Since the maximum deceleration of a vehicle which can be effected by braking roughly corresponds to the negative of earth acceleration in free fall, that is, about to −1g, the circuit values are so adjusted that the current supplied by the constant current source provides for discharge of the capacitor approximately in accordance with maximum deceleration.

The "slowest wheel detection stage" 143 (FIG. 5) is illustrated in detail in FIG. 11: It consists, essentially, of the parallel circuit of two transistors 238, 239, which have their bases connected to the inputs 141, 142 of the circuit. Both collectors of the transistors are connected together and to the negative bus 204; both emitters are connected to a common junction 240 which is connected to the output 144 on the one hand, and over a resistor 241 to the positive bus 209 on the other.

Another embodiment of the selector stage 125 is shown in detail in FIG. 12. The terminals to the circuit are identical to those previously discussed in connection with FIG. 5. In contrast to the circuit of FIG. 6, however, the circuit of FIG. 12 includes only a single threshold switch 250 in the form of an amplifier stage, to which an inverter having a transistor 251 is connected. The logical connection of the inputs 121, 122 to the output 127 in dependence on the selected mode — select high or select low — effected by the diode logic 252. A simple pressure switch 253 is provided, rather than the transfer switch 186 (FIG. 6). When the pressure switch 253 is open, then the circuit is in the select high mode. A transistor 254 and forming an inverter stage is connected in series with the terminal of the pressure switch 253.

The diode logic 252 has four inputs 256–259. The two inputs 256 and 257 are provided to determine which one of the two inputs 121, 122 has a higher value. Input 256 is directly connected to the output of the threshold; the input 257 is connected to the inverter stage which is connected to the output of the threshold stage 250, that is, to the collector of transistor 251.

Inputs 258, 259 determine the selected control mode, namely whether select high of select low are to be used as the appropriate control base. In the position shown in the drawing, switch 253, which is open, provides a 0-signal to the input 258 and a 1-signal to the input 259 due to the inverting effect of transistor 254. Two outputs 260, 261 of the diode logic 252 provide for signal transfer of signals either from input 121 or from input 122 to the output 127. This signal transfer is controlled by the transistors 263, 264. Transistor 263 is connected to the input 121 and transistor 264 to the input 122.

The diode logic 252 comprises a diode resistance combination having eight diodes and four resistors, connected as a symmetrical array. The anodes of two diodes 270, 271 are connected to the output 260 of the diode logic; the cathode of diode 270 is connected over a resistor 272 with the input 256; the cathode of the diode 271 is connected over a resistor 273 with the input 257. A diode 275, connected in blocking direction, is connected from the junction of diode 270 and resistor 272 to the input 258. Correspondingly, a diode 276 connected in blocking direction is connected between the junction of diode 271 and resistor 273 and the input 259. In similar manner, the input 257 and the output 261 are connected by the series circuit formed of a resistor 280 and a diode 281, from the junction of which a diode 282 connects to the input 258. A further series circuit comprising a resistor 284 and a diode 285 is connected between the output 261 and the input 256. The junction between resistor 284 and diode 285 is connected over a diode 286, poled in blocking direction, to the input 259.

The signal transfer characteristics of this circuit will be identical to that previously discussed in connection with FIG. 5.

Various changes and modifications may be made; the anti-locking braking system can be used for vehicles other than two-axle vehicles, such as automotive passenger cars; it can readily be expanded for use with vehicles having more than two axles.

The threshold circuit 130 may be constructed in a manner similar to that of stage 149 (FIG. 10); the modifying inputs 131, 132 may be formed, respectively, by connections similar to terminals 148 and tap 232, depending on the polarity of the signal, by changing, for example, the tap point or adding signals at the respective terminal or junction to modify the voltage relationship at the junctions 222, 232, respectively.

I claim:

1. Vehicle brake anti-lock system for multi-axle vehicles, comprising
   means (28–32) sensing circumferential speed of at least two wheels at opposite sides of the vehicle and deriving respective right (R, 50) and left (L, 51) speed signals;
   a speed simulation stage (120) having an output of said speed sensing means connected thereto and providing a vehicle speed signal;
   differentiating means (129) connected to some of the sensing means and providing a rate-of-change of wheel speed signal;
   a source of brake fluid under differential pressure (61, 62, 63);
   valve means (40, 41) controlling supply of differential brake fluid pressure to the brakes of the wheels of the vehicle;
   operator controlled means (43) controlling supply of pressurized brake fluid from said source (61, 62, 63) to said valve means (40, 41);
   a wheel brake controller (100) connected to and controlled by said wheel speed signals, said vehicle speed signal, and the rate-of-change signals and providing output signals to said valve means for selectively energizing said valve means and controlling application to and drainage of said differentially pressurized brake fluid to effect lowering or raising of differential brake fluid pressure in the brakes as commanded by the relative values of said signals,
   a selection circuit (125) connected to have said left and right speed signals applied thereto and, selectively, providing an output signal representative of the speed of the respective faster, or slower one of said wheels in dependence on whether said selection circuit is set in either a select high or select low mode position;
   and pressure sensing means connected to sense the pressure of pressurized brake fluid, as controlled by said operator control means, and providing an output signal to said selection circuit (125) to control the mode position of said selection circuit;
   said valve means comprising a common control valve (40) controlling the supply of differential pressurized brake fluid to both the left and right wheels, and said controller (100) controlling the operation of said common valve (40) in accordance with the relative value of the selected output signal as determined by the selected mode by said selection circuit.

2. System according to claim 1, wherein, when the pressure as commanded by said operator controlled means (43) is comparatively low, the pressure sensing means controls the selection circuit to select the select low mode position to provide an output signal representative of the speed of the slower one of said wheels; and, when the sensed fluid pressure is relatively high, the selection circuit (125) is controlled to be in the select high mode position to provide output signals corresponding to the speed of the wheel having the higher speed.

3. System according to claim 1, wherein the selection circuit (125) comprises at least one threshold switch (175, 176; 250) to determine a speed threshold level of the wheel having the higher rotary speed;
   the system includes means sensing differential brake fluid pressure in advance of said valve means;
   and wherein the selection circuit further comprises switch means (182, 253) connected to and controlled by the fluid pressure as sensed by said pressure switch means, the switch means being connected to the output of the threshold switch and to inputs having the speed signals from the wheels applied thereto to select, and connect to the output of the selection circuit, under control of the position of the pressure-dependent switch, either the signal which is above the threshold level of the threshold switch, or the signal which is below the threshold level of the threshold switch, to provide, selectively, output signals corresponding to the select high of the select low mode.

4. System according to claim 1, further comprising means (130) comparing the speed of the respective wheel providing said output signal representative of speed as derived from the selection circuit with the vehicle speed signal, and wherein said controller (50) comprises means to control application of pressurized brake fluid to the respective valve means in accordance with sensed slip, or differential speed between circumferential wheel speed and vehicle speed, the control being effected by said controller being variable in dependence of sensed slip, the variation being commanded and controlled by said rate-of-change wheel speed signal in the direction of lower slip causing dropping in differential brake fluid pressure when the deceleration of the wheel selected by said selection circuit increases and, when the deceleration of the selected wheel decreases, or changes to acceleration, commands operation of said valve means in accordance with an increasing degree of wheel slip, or differential speed of the vehicle and the circumferential wheel speed.

5. System according to claim 1, wherein the speed signals connected to said selection circuits are the signals derived from the front wheels of the vehicle.

6. System according to claim 1, wherein the speed signals connected to the selection circuit are derived from non-driven wheels of the vehicle.

7. System according to claim 1, wherein the valve means comprises a composite valve system permitting application of brake pressure and dropping of brake pressure;

and wherein said controller controls selectively application of brake pressure, or dropping of brake pressure, in accordance with said rate-of-change signals as derived from the sensing means associated with the wheel selected by the selection circuit, as well as with difference in speed between the respective wheels of the vehicle and vehicle speed, as simulated by a speed simulation signal.

8. Vehicle brake anti-lock system for multi-axle vehicles, comprising means (28) sensing circumferential speed of the right front wheel (20) of the vehicle;

means (29) sensing circumferential speed of the left front wheel of the vehicle;

each said sensing means providing a respective wheel speed output signal;

a speed simulation stage (120) having the outputs of said speed sensing means connected thereto and providing a vehicle speed signal representative of at least simulated vehicle ground speed;

differentiating means (129) having an input to which a speed signal can be applied and providing an output corresponding to the rate-of-change of the wheel speed signal indicative of deceleration or acceleration of the respective wheel;

operator-controlled means (43, 60, 61, 62, 63) providing, as commanded by the operator, pressurized brake fluid of varying pressure, under operator command;

valve means (40) controlling admission of brake fluid under said commanded pressure to the brakes of both said front wheels (20, 21);

a wheel brake controller (100) connected to and controlled by said wheel speed signals, said simulated vehicle speed signal and said rate-of-change signal, and providing an output to said valve means (40) to effect lowering or raising of differential brake fluid pressure in said brakes as commanded by the relative values of said signals to prevent locking of either one of said wheels, a selection circuit (125) connected to have said respective left speed signal and the respective right speed signal applied thereto, and including a switch-over circuit commanding connection of either the higher one or the lower one of said signals representative, respectively, of the faster or slower one of said wheels to form the controlling signal parameter for said controller (100) to cause said controller to control operation of said valve means as a common control for both said front wheels either in a select high or a select low mode, in dependence on whether the faster or slower wheel is selected;

pressure-sensitive switch-over means connected to and controlled by the fluid pressure as commanded by the operator and controlling the selection mode of said selection circuit as a function of and as commanded by the operator of the vehicle as sensed by said operator-controlled means (43), and wherein, when the operator-controlled means commands a high differential brake fluid pressure, the selection circuit is placed in the select high position and, conversely, when the operator commands low braking pressure, the selection circuit is placed in the select low mode position, whereby, when the selection circuit is in the select high position, the output signal therefrom applied to said controller will have a higher relative value and thus permit operation of the braking system with higher braking effort and thus favor braking effort over attitude stability of the vehicle, while, when the braking effort is low, and the selection circuit is in the select low mode, the controller will cause the anti-lock system to provide control signals based on a lower signal level and thus favor directional stability of the vehicle over braking effort.

* * * * *